March 20, 1962     K. E. BOOKE     3,025,724
TORSIONALLY RESILIENT DRIVE COUPLING Filed April 6, 1960     2 Sheets-Sheet 1

INVENTOR.
KENNETH E. BOOKE
BY
MAHONEY MILLER & RAMBO ATTY'S.
BY

March 20, 1962  K. E. BOOKE  3,025,724
TORSIONALLY RESILIENT DRIVE COUPLING
Filed April 6, 1960  2 Sheets-Sheet 2

INVENTOR.
KENNETH E. BOOKE
BY
MAHONEY MILLER & RAMBO ATTY'S.

United States Patent Office 3,025,724
Patented Mar. 20, 1962

3,025,724
TORSIONALLY RESILIENT DRIVE COUPLING
Kenneth E. Booke, Rte. 1, Marengo, Ohio, assignor of one-half to Frank Carson, Mount Gilead, Ohio
Filed Apr. 6, 1960, Ser. No. 20,457
3 Claims. (Cl. 74—752)

My invention relates to a torsionally resilient drive coupling. It relates, more particularly, to a coupling which will drive in either direction and is adapted to be incorporated between a driving shaft and a driven shaft and which is torsionally resilient so as to absorb or cushion some of the torque shocks which may occur between the shafts during the driving action. Furthermore, it relates to a torsionally resilient drive coupling which provides for free wheeling or overrunning of the drive shaft relative to the driven shaft if a certain torque level of resistance at the driven shaft is exceeded.

According to my invention, I provide a torsionally resilient drive coupling which includes an epicyclic or planetary train of gearing arranged between the adjacent ends of the two shafts. The sun gear of the gearing is fixed to the driven shaft and the planetary gears or pinions are carried by the driving shaft for revolving movement about the axis of the driving shaft and for rotation about their own axes. The planetary gears are positioned around the sun gear and in mesh therewith and will either revolve around the sun gear or, when the sun gear offers sufficient torque resistance, will rotate about their own axes. The coupling is so designed and constructed that centrifugal force will act to couple the driving shaft to the driven shaft. To accomplish this coupling action by centrifugal force, each of the pinions or planetary gears is unbalanced. As the driving shaft revolves the planetary gears around the stationary sun gear, they will rotate about their own axes and if some means is provided to stop rotation of the planetary gears about their own axes, the heavier portion of each gear would then tend to remain in an outermost position due to centrifugal force and such force would thereafter act as a coupling force unless overcome. The eccentric or unbalanced weight of each planetary gear would, therefore, tend to keep it from rotating about its own axis after it has been stopped from rotating on its own axis. When rotation of all the planetary gears is stopped, the planetary gears will stop their epicyclic movement relative to the sun gear and, therefore, drive the sun gear and the driven shaft will, therefore, be driven by the driving shaft with a one-to-one ratio, although overrunning or free wheeling can occur if the driven shaft at any instant provides an excessive level of torque resistance sufficient to overcome the driving centrifugal force, since the planetary gears can be rotated about their own axes. Furthermore, torsional vibrations between the shafts will be absorbed by rocking of the planetary gears about their own axes. The coupling action will be maintained as long as the centrifugal force of the planetary gearing balances the torque resistance of the driven shaft. However, if this balance is once upset, so that the planetary gears started to rotate, then another force will be required to again stop rotation of the planetary gears and make the centrifugal force effective to restore balance.

It is, therefore, necessary to provide means to aid in stopping the rotation of the planetary gears about their own axes so as to couple the shafts together. This means I will term a coupling starting force and is effective to start the centrifugal force to act as the coupling force. This coupling starting force may be provided by fluid means which provides a force that increases as the speed of rotation of the planetary gears increases and which is effective to decrease gradually the speed of rotation of the planetary gears about their own axes and finally stop that rotation with their heavier portions outermost. However, mechanical or frictional means may be provided as the coupling starting force to stop or prevent rotation of the planetary gears about their own axes with those heavier portions outermost so that centrifugal force will cause the planetary gearing to take over the drive, at which time the drive will be torsionally resilient.

In the accompanying drawings and following description, I have disclosed the torsionally resilient drive coupling as being a combination fluid and centrifugal coupling. With this disclosed coupling, the coupling action is started and then stabilized by fluid resistance to the rotation of the planetary gears and then centrifugal force will carry the load and dampen torsional vibrations.

The accompanying drawings illustrate a preferred embodiment of my invention and in these drawings.

Figure 1:
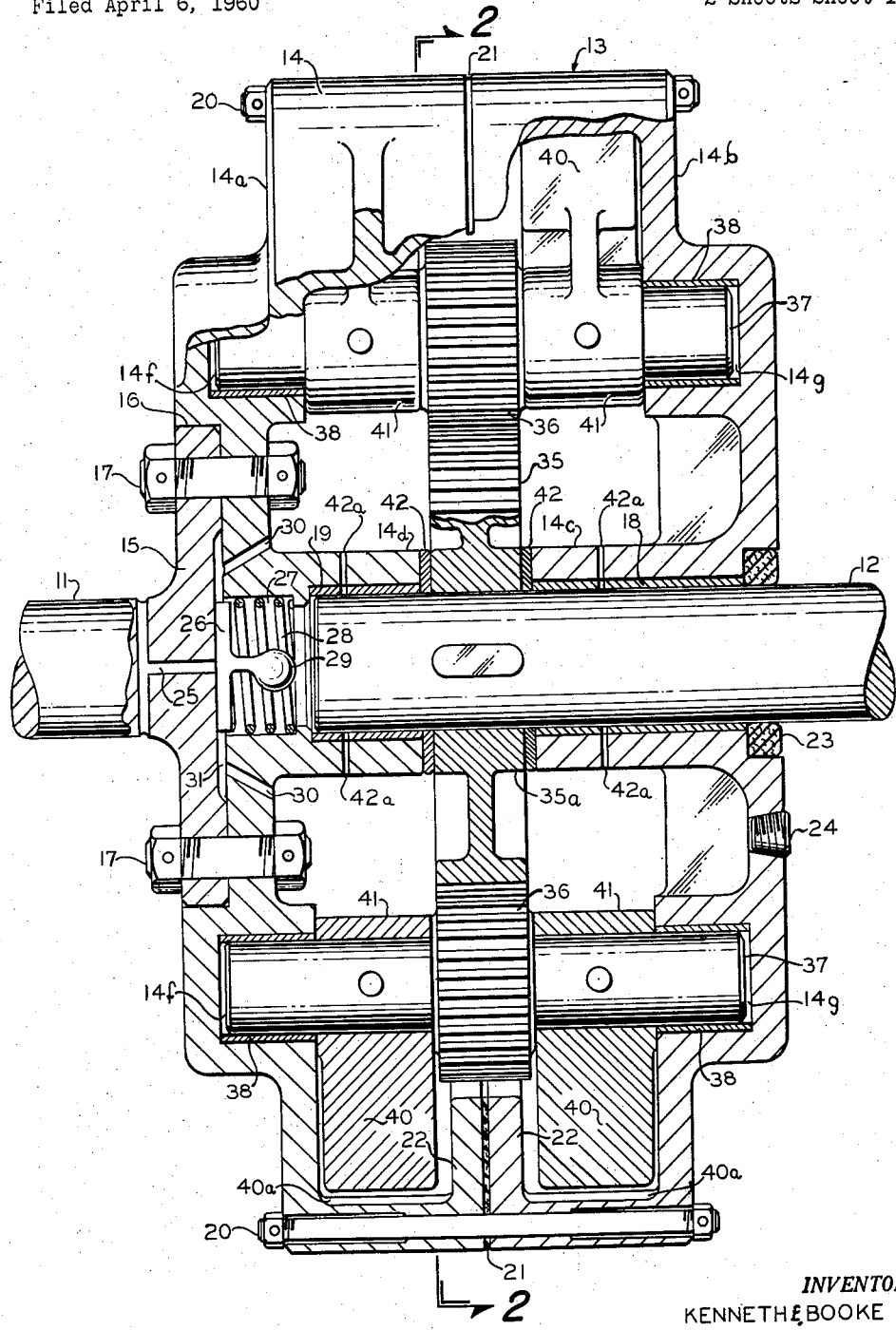
FIGURE 1 is an axial sectional view taken along line 1—1 of FIGURE 2 through a combination fluid and centrifugal coupling embodying my invention.

With reference to the drawings, I have illustrated in FIGURE 1 a driving shaft 11, which may receive power from any suitable source, and a driven shaft 12, which is adapted to be coupled to the driving shaft 11 and to be driven thereby. As previously indicated, the coupling disclosed herein for coupling the driving shaft to the driven shaft is a combination centrifugal and fluid actuated coupling and this coupling is indicated generally by the numeral 13 in the drawings. Obviously, the driven shaft 12 may be used for applying power to any suitable unit. The coupling 13 will provide a torsionally resilient driving coupling between concentrically disposed driving shaft 11 and driven shaft 12.

The coupling is shown as including a drum-like fluid housing or case 14 which is formed of drum half-sections 14a and 14b. The shaft 11 is provided with a disc-like driving member 15 which is attached to or integral with the shaft. This member 15 fits within a recess 16 in the outer wall of the drum section 14a and is bolted thereto by means of fitted bolt and nut units 17. Thus, the shaft 11 will be attached to the drum half-section 14a for driving it therewith. The other half-section 14b of the drum 14 is mounted by means of bearing bushing 18 on the concentrically disposed driven shaft 12 for rotation relative thereto, the bushing 18 being disposed in a hub 14c of the section 14b. The inner end of this shaft 12 is mounted in a bushing 19 at its inner end for relative rotation within the hub 14d of the drum half-section 14a. The drum half-section 14b is bolted to the half-section 14a for rotation therewith by means of the fitted bolt and nut units 20. These units serve to clamp the two drum half-sections 14a and 14b together with a sealing gasket 21 between the annular inwardly extending flanges 22 provided at the meeting peripheral edges of the drum half-sections. The drum half-section 14b is provided in its flat wall with an oil seal 23 around the shaft 12. Thus, the drum 14 itself is of fluid-tight construction and is provided with a fluid-tight seal about the shaft 12, the shaft 11 being attached to the exterior of the drum. Thus, when the shaft 11 rotates, the housing or case 14 is driven about an axis corresponding to the aligning axes of the concentric shafts 11 and 12. The housing sections may be provided with exterior and interior reinforcing ribs, as indicated, if desired.

Figure 3:
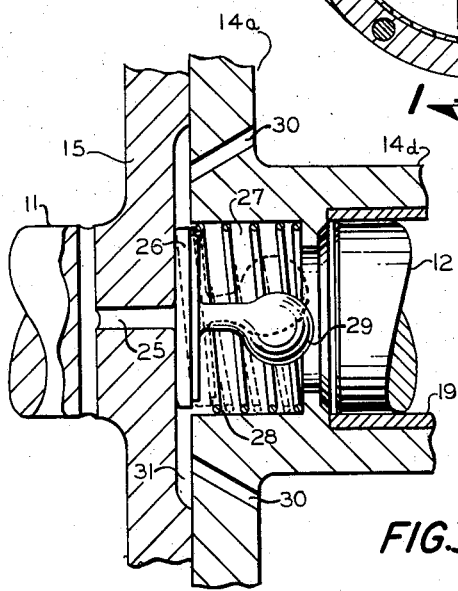
FIGURE 3 is an enlarged detail of a vent valve used in the coupling.

For providing a suitable amount of oil or other suitable fluid within the drum 14, a removable plug 24 is provided, for example, in the flat wall of the half-drum section 14b. For providing a vent for the case or housing 14 to relieve pressure due to heat generated therein during the starting operation of the coupling, I provide a vent passage 25 leading axially from the case or housing through the disc-like driving member 15 and the shaft 11 to the atmosphere. The inner end of this vent passageway is controlled by a disc-like valve 26 disposed within a chamber 27 at the inner end of the shaft 12 and concentric therewith. This valve is normally seated in covering relationship to the inner end of the vent passage 25 by means of a compression spring 28. However, it can be unseated when the housing 14 is rotated and attains a certain speed by means of centrifugal force created by an eccentric weight 29. This weight 29 is attached to the inner face of the disc 26 and is eccentrically arranged so as to be unbalanced. When the housing 14 reaches a certain speed, the valve will be unseated, as indicated by broken lines in FIGURE 3. At this time, pressure within the case or housing 14 will be relieved through vents 30 that connect the exterior of the housing to a passage 31 formed by a recess in the inner face of the driving member 15. The inner end of the passage 25 is at the passage 31 and is normally covered by the disc 26 which normally is seated in this recessed passage 31 by the spring 28.

Figure 2:
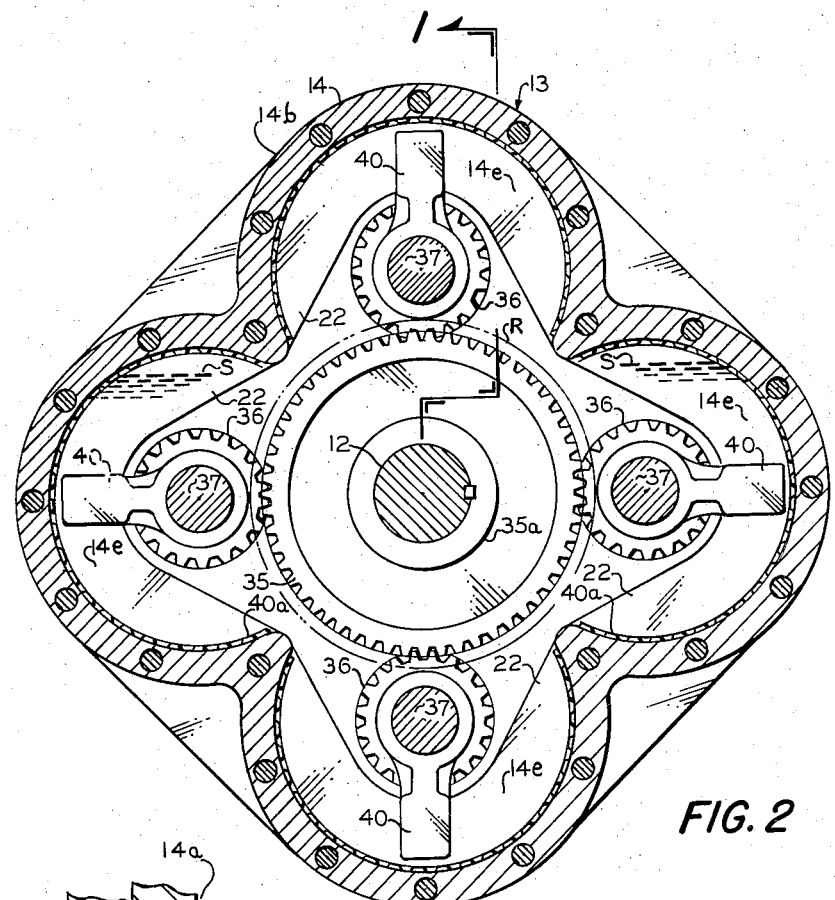
FIGURE 2 is a transverse sectional view through the coupling taken along line 2—2 of FIGURE 1.

The planetary or epicyclic gearing is disposed within the housing 14. It includes a sun gear 35 which is keyed on the shaft 12 and which is provided with a hub 35a disposed concentric with and between the hubs 14c and 14d of the housing sections. Disposed around the sun gear at angularly spaced positions are the planetary gears 36. These gears and associated parts are disposed in circular pockets 14e formed in the periphery of the housing or case 14. It will be noted that four planetary gears or pinions 36 are provided and, therefore, the housing 14 has four pockets 14e so that it has a four-leaf clover shape as shown in FIGURE 2. However, any desired number of gears may be provided and the shape of the housing can be varied accordingly.

Each of the planetary gears 36 is carried by or is formed integral with, as shown, a shaft 37. The opposed ends of the shaft 37 are rotatably mounted in bushings 38 disposed in socket portions 14f and 14g formed at the innteriors of the housing sections 14a and 14b, respectively, the sockets thereof facing toward each other. The shafts 37 position the various gears 36 so that they are in meshing relationship with the sun gear 35. At the opposite sides of each gear 36, impeller blades 40 are provided. Each of these impeller blades is carried by a hub 41 which is keyed on the shaft 37. Each hub 41 is disposed between the gear 36 and the inner ends of the associated socket portion 14f or 14g to provide thrust bearings for maintaining the gear in a central plane in the housing. The sun gear 35 is maintained in the same plane for properly meshing with the pinions 36 by means of thrust bearings 42 provided on the shaft 12 at opposite sides thereof. It will be noted from FIGURE 2 that the outer ends of the blades 40 of the impellers, in their swinging movement about the axes of the shafts 37, sweep close to the inner surfaces of the outer walls of the pockets 14e. These walls are provided with a corrugated or roughened surface 40a to increase the effectiveness of the oil therein as a coupling starting force. The curvature of these surfaces is concentric with the axes of the shafts 37. Furthermore, it will be noted from FIGURE 1 that the blades 40 will clear the hubs 14c and 14d and associated bearings 42 as they swing inwardly past such members.

The impeller blades 40 not only serve as impellers to act on the mass of oil or other liquid within the housing 14 but also serve as the unbalanced weight for the corresponding planetary gears 36 to produce the centrifugal action desired, as will be explained later, to cause the coupling to drive the driven shaft 12. It will be apparent that each pair of impeller blades 40 associated with a planetary gear 36 on a shaft 37, will provide an eccentric weight structure for that gear which will be unbalanced about the axis of the shaft 37. It will further be apparent that each pair of the impeller blades 40 and the associated gear 36 will rotate as a unit.

In the operation of this structure, the housing is filled with oil or other suitable fluid to a suitable level, for example, the level indicated by the letter S in FIGURE 2. However, it should be understood that the level can be varied and that this will vary the necessary starting period of the coupling. If the shaft 11 is now driven, this causes the planetary gears 36 to travel epicyclic or to revolve around the sun gear 35 which is fixed to or keyed to the shaft 12. The planetary gears 36 will revolve with the housing 14 which carries them and since the housing 14 is attached to the shaft 11 for rotation therewith, the planetary gears travel about the sun gear 35. The shaft 12, being connected to some unit to be driven, will offer some resistance to rotation and, therefore, the planetary gears travel around the sun gear without driving the shaft 12. This, consequently, will cause the planetary gears 36 to rotate about their own axes and to rotate the impeller blades 40 about the same axes. The housing or case 14 will be rotating with the driving shaft 11 and will carry with it at the same speed the mass or body of oil within the case or housing. The position of the inner surface of the body of oil, in the position it assumes due to centrifugal force, is indicated by the annular broken line R in FIGURE 2. The impeller blades 40 wipe the oil out of the pockets toward the center of the housing, thereby tending to overcome the centrifugal force tending to keep the oil out in the pockets and dumping it over the edge of one pocket into the next and this speeds the mass of oil up to travel around the axis of the coupling faster than the case is rotating. As this requires the expending of energy, a resistance is set up which starts the coupling to drive. As the revolving housing 14 picks up speed, the impeller blades 40 meet increasing resistance as they wipe the oil out of the pockets 14e toward the center of the housing and into the next pocket. This resistance will eventually be sufficient to hold the impeller blades 40 from rotating since the fluid will act as a resistance to swinging of the blades, this resistance being enhanced by the roughened surfaces 40a of the pockets 14e. The eccentric weight provided by the blades 40 is such that after rotation of the planetary gears 36 is once stopped, the centrifugal force created by this unbalanced weight, that is, the tendency for the blades 40 to remain in their outermost positions, will serve as the coupling force. Thus, the resistance offered by the oil to the swinging of the blades 40 will gradually decrease rotation of the planetary gears 36 about their axes and eventually stop that rotation. As the planetary gears 36 do rotate more slowly, their revolving movement about the sun gear 35 decreases and the torsional resistance of the shaft 12 is gradually balanced to start the rotation of the shaft 12 and gradually bring it up to the desired speed. Full speed of the driven shaft 12, that is, a speed corresponding to that of the shaft 11, will be reached when the resistance of the oil passing against the impeller blades 40 completely stops rotation of the planetary gears 36 about their axes or slows them nearly to a stop. At this time, centrifugal force alone will take over as the coupling force and will normally prevent the planetary gears 36 from rotating about their axes. This is due to the fact that the eccentric weight load provided by the impeller blades 40 tending to remain in their outermost position, stabilizes each planetary gear 36 and prevents its rotation about its axis. If power surges should overcome the centrifugal force and make the planetary gears 36 rotatae on their own axes a few times, then the resistance the impeller blades 40 meet in the oil would slow them down again and let them lock in the driving or coupling position. Torsional vibrations between the driven shaft 12 and the driving shaft 11 will be absorbed by slight rocking of the planetary gears 36 on their own axes which overcomes the coupling centrifugal force. Furthermore, if the shaft 12 encounters unusual torque resistance, the coupling provides for free wheeling or overrunning of the driven shaft 12 by the driving shaft 11, the planetary gears 36 rotating about their own axes during this action.

The valve 26 will provide a vent when the housing 14 is rotating, for automatically venting pressure created by heat developed in the starting operation. This heat is developed in the oil by the impeller blades 40 swinging therethrough or by the friction of the oil passing over the pocket walls and edges. However, after once started, the coupling will generate very little heat. The vent is such that it closes when rotation of the housing is stopped and opens when the housing is rotated, but since it is at the center of the housing, no oil will escape. Lubricating bores 42a may be provided in the hubs 14c and 14d of the housing sections to permit oil to reach the shaft 12.

It will be apparent that this coupling will be useful in many applications and particularly in installations where it is desirable to preclude backlash or chatter in the drive. For example, the coupling would be useful in a high speed engine driven blower installation that delivers air to the much slower reciprocating engine. My coupling would dampen or isolate torsional vibrations in the drive to the blower while the engine was running and when it was shut down, this coupling would allow the step-up gear train to the blower to disconnect the drive near stopping speed, thereby saving the gear train from excessive wear in whipping back and forth, as the engine main crank shaft rocks to a stop. Since with my coupling the driving shaft can drive in either direction, the coupling would be particularly useful in a reversible main marine drive between the engine and a step-up speed increaser gear box.

It will be apparent from the above description that I have provided a torsionally resilient drive coupling which includes planetary gearing wherein each of the planetary gears or pinions around the sun gear is unbalanced on its own axis but as a group are arranged to counterbalance each other during operation of the coupling. The result is that when the planetary gears are once precluded from rotating about their own axes, centrifugal force will continue to keep them from so rotating and will act as the resilient coupling force between the planetary gears and the sun gear. The coupling starting force, that is, the force which precludes rotation of the planetary gears so that their heavier portions can assume an outermost position, is preferably provided by a fluid means as described. However, it can be provided by mechanical means. This force will either hold the planetary gears in coupling starting position, until the driven shaft reaches a selected speed and the centrifugal force can take over as the coupling force, or will gradually bring them into such position. When in such position, the centrifugal action on the planetary gears will serve as the resilient coupling force and will be the only active coupling force balancing the torque resistance offered by the driven shaft. The coupling action will be maintained as long as the effective centrifugal force provided by the unbalanced planetary gearing balances the torque resistance of the driven shaft. Resilience between the two shafts will be provided by rocking of the planetary gears but if the balance is once upset by excessive torque resistance so that the planetary gears start to rotate about their axes, then another force will be required to again stop rotation of such gears and make the centrifugal force effective to restore balance, this additional force preferably being provided by the fluid means described.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A combination fluid and centrifugal coupling comprising a drive shaft, a liquid case mounted on the drive shaft for rotation therewith about the axis of the case, said case having an outer peripheral wall spaced radially from said axis of the drive shaft, a driven shaft extending into the case and mounted therein for relative rotation with its axis in alignment with the axis of the drive shaft, a sun gear nonrotatably and coaxially carried by the driven shaft within the case, a set of planetary gears around the sun gear within the case and meshing therewith for rotation about their own axes and revolving movement around the sun gear, each of the planetary gears being carried by a shaft mounted in the case for rotation about an axis parallel with the aligning axes of the drive shaft and driven shaft and spaced radially outwardly therefrom so that the planetary gear is adjacent said outer peripheral wall of the case, an impeller blade operatively connected to each of said planetary gear shafts and extending radially outwardly from the axis thereof close to the peripheral wall of said case so as to provide an unbalanced eccentric weight which rotates with its cooperating planetary gear and which will act by centrifugal force upon rotation of said drive shaft to tend to stop rotation of the planetary gear about its own axis, said liquid case having a continuous internal chamber which is partially filled with liquid so that upon rotation thereof centrifugal force will create a continuous body of liquid in the outer portion of the case which will act on the impeller blades of the planetary gears to aid the force created by the unbalanced weights of the planetary gears to resist rotation of the planetary gears about their own axes and thereby couple the planetary gears and the sun gear together.

2. A combination according to claim 1 in which said case has arcuate pockets formed in its peripheral wall in which the respective planetary gears are concentrically disposed, each of said impeller blades extending outwardly from the axis of its cooperating planetary gear a distance closely approaching the radius of the cooperating pocket so that the outer end of the blade sweeps close to the arcuate wall of the pocket to increase the resistance of the liquid to movement of the impeller blade through the pocket.

3. A combination according to claim 2 in which the walls of said pockets are provided with roughened surfaces to resist movement of the liquid out of the pockets.

References Cited in the file of this patent

UNITED STATES PATENTS

| | | |
|---|---|---|
| 1,816,735 | Magness | July 28, 1931 |
| 1,936,165 | Janssen | Nov. 21, 1933 |
| 2,040,136 | Hobbs | May 12, 1936 |
| 2,175,970 | Perkins | Oct. 10, 1939 |
| 2,200,157 | Christlein | May 7, 1940 |
| 2,564,212 | Ramsey | Aug. 14, 1951 |

FOREIGN PATENTS

| | | |
|---|---|---|
| 693,978 | France | Sept. 8, 1930 |
| 437,116 | Great Britain | Oct. 24, 1935 |